Dec. 24, 1968     J. LA TORRE     3,418,012
FASTENER FOR PRESTRESSING OBJECTS CONNECTED THEREBY
Filed Oct. 17, 1966
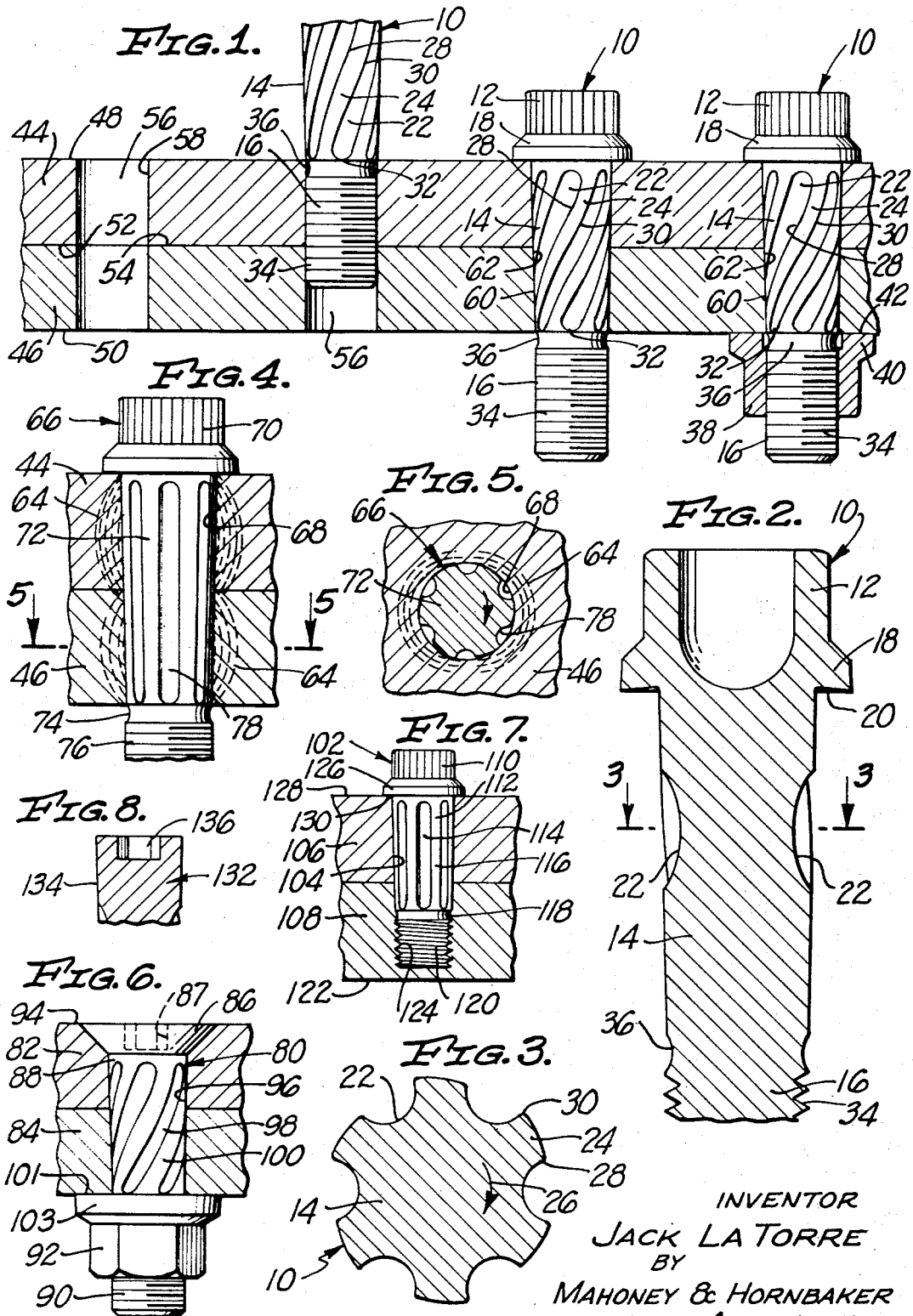
INVENTOR
JACK LA TORRE
BY
MAHONEY & HORNBAKER
ATTORNEYS United States Patent Office 3,418,012
Patented Dec. 24, 1968

3,418,012
FASTENER FOR PRESTRESSING OBJECTS
CONNECTED THEREBY
Jack La Torre, Long Beach, Calif., assignor of thirty-three and one-third percent to Thomas P. Mahoney, Malibu, Calif.
Filed Oct. 17, 1966, Ser. No. 587,268
7 Claims. (Cl. 287—189.36)

ABSTRACT OF THE DISCLOSURE

A fastener which is adapted to prestress the metal surrounding a bore into which it is inserted. The fastener has a shank incorporating a tapered swaging portion which is provided with a plurality of swaging flutes that cause the metal of the straight bore to be displaced into a tapered configuration corresponding to the taper of the swaging portion. This is accomplished by the method of driving the fastener in a rotary manner into the straight bore which is also a feature of the invention.

---

This invention relates to a fastener for prestressing objects connected by said fastener and more particularly, to a fastener of the type in which the fastener is installed in an opening formed through abutting metal objects to be fastened by said fastener, said installation positioning said fastener extending through the major portion of each of said objects and said installation creating interference between said fastener and said objects for prestressing the metal of said objects surrounding said fastener. Even more particularly, this invention relates to a fastener of the foregoing type with which it is possible to produce vastly improved controlled prestressing of the metal of objects connected thereby and controlled tensioning of the fastener in said object prestressing condition heretofore impossible with fasteners of similar type.

Certain prior forms of fasteners have been provided for prestressing metal objects connected by said fasteners. One such prior form includes a tapered bolt having a threaded leading end thereon which is installed extending through said object opening, with said leading end projecting beyond said objects and being engaged by a nut bearing axially against said objects. The procedure for installation of this prior fastener is the provision of an exact size, pilot drilled, reamed, tapered hole through the objects, said hole having precisely the same taper as the bolt and being of a size permitting the axial insertion of the bolt without interference to a position in which only a part of the bolt threaded leading end projects from said objects. The threaded leading end is then engaged by a nut and continued progressive threaded engagement of said nut more fully with said threaded leading end draws the bolt axially into the object hole and creates the necessary interference between said bolt and said objects for prestressing the objects.

With said prior fastener construction, it is necessary that the nut will remain at all times threadably engaged with the bolt in order to retain the bolt properly located extending through and prestressing the objects. Furthermore, as previously stated, it is critically important that the object opening will be of an exact reamed size relative to the bolt size in order that the bolt will be capable of proper installation and produce the desired prestressing of the objects, the taper of the object hole exactly matching the taper of the bolt. Still further, it is necessary that the bolt threads are of a particular size and strength, and that the nut has a particular relationship to the bolt for any given application.

The bolt threads must be of a size and strength sufficient to virtually axially draw the bolt into interference in the object tapered opening with the object metal surrounding said opening in order to produce the desired object metal prestressing. Additionally, the nut engaged with said bolt must be of greater tensile strength than the bolt in order to create the tension required for drawing the bolt into the object opening for the object prestressing, while still being free from producing excessive torsional loads on said bolt during the prestressing installation thereof. However, an undue load is placed on the threads of the bolt due to the torsional load exerted thereupon by the nut as it pulls the bolt into position in the tapered opening. As also previously stated, after the prestressing installation of the bolt, it is absolutely necessary to maintain a tensile engagement between the bolt and the nut in order to retain the bolt in proper installed position and at least in certain cases, it has been necessary to deform the nut or bolt threads, either during or after such installation, in order to insure that the nut will remain permanently engaged with and producing a tensile load on said bolt.

It is well known to those skilled in the art that the structural characteristics of metal objects connected to each other by bolts can be materially enhanced by preloading or prestressing the material of the objects adjacent the bolt location. It is also well known to those skilled in the art that the creation of carefully controlled prestressed areas in the object metal by means of the peculiar physical characteristics of the bolts utilized to connect metal objects will greatly enhance the structural capabilities of the material of said objects by taking advantage of the controlled prestressed areas. In order that full advantage of said controlled prestressed areas may be utilized, it is obviously necessary that once the bolt has been installed in said objects and producing the desired controlled prestressing of said objects, the exact prestressing relationship between said bolt and objects must be maintained constant.

In the use of the prior fastener constructions, as discussed in the foregoing, the installation of the bolt extending through said objects and producing said prestressing of the metal of the objects, due to the particular manner of installation, cannot produce more than very slight cold working of the object metal around the opening. Thus, objects so fastened and prestressed, with only a slight tendency of working and movement therebetween, will quickly cause additional object metal deformation which can completely destroy the prestressing relationship between the bolt and objects, and this is particularly true even when the metal objects originally contain a high degree of hardness.

It is, therefore, an object of my invention to provide a fastener for prestressing objects connected thereby with which said fastener, in the form of a bolt, is provided originally tapered, but does not require an exact, reamed object hole or opening, but rather makes use of an axially straight, cylindrical or uniform diameter object opening so as to eliminate the necessary consequent metal working operations required for forming said exact, tapered object holes. With the fastener or bolt of the present invention, the original cylindrical hole diameter is formed dimensioned approximately the minimum diameter of the bolt taper, and during installation of the bolt in the object opening into the prestressing relationship with the objects, combined rotative and axial movement of the bolt displaces and relocates the object metal about the object opening, without metal removal, to permit final location of the bolt in proper prestressing relationship with the objects and with the degree of prestressing capable of exact predetermination. Thus, installation of the bolt into the desired prestressing relationship with and extending through the objects results in the bolt self-establishing its own tapered opening so as to eliminate many costly metal working operations heretofore required with prior fasteners of the same general character.

It is a further object of my invention to provide a fastener for prestressing objects connected thereby of the foregoing type wherein during the installation of the bolt and the resulting self-establishment of the object tapered opening, the object metal surrounding and forming the object opening is extensively subjected to cold working so as to greatly increase the metal hardness and strength. This cold working metal hardness and strength increase greatly enhances the bolt and object prestressing relationship, as well as the pure fastening of the objects by the bolt. For this reason, the objects will resist greatly increased tendencies to work and move relative to each other, while still retaining proper prestressing relationship between the bolt and objects, and this is true without considerations of attempting to increase the original member metal hardness in an attempt to counteract such working and movement.

It is still a further object of my invention to provide a fastener for prestressing objects connected thereby of the foregoing character wherein, due to the self-establishment by the bolt of the object tapered opening, the bolt will remain in proper prestressing relationship with the objects connected thereby without the need for engagement of the bolt leading end with a nut, or threaded engagement of the bolt leading end with one of the objects so connected. Again, due to the self-establishment of the object tapered opening by the bolt, and particularly with pure metal displacement without metal removal, not only is sufficient interference established between the bolt and the object metal surrounding the object opening, but said interference creates an axial holding force on the bolt for retaining the bolt properly positioned in said prestressing relationship. The object metal displacement during the bolt installation is accomplished by forming the bolt with circumferentially spaced, generally axial flutes having both circumferentially directed and axially directed object metal engaging corners or edges which are blunt, or slightly rounded or arcuate, so as to displace and cold work object metal during the combined installation axial and rotative movement of the bolt, rather than the removal of said object metal.

It is also an object of my invention to provide a fastener for prestressing objects connected thereby of the foregoing character with which the bolt prestressing relationship with the objects is established prior to engagement by and without the aid of a nut so that the sole considerations of bolt and nut thread strength are those having to do with axial tensioning of the bolt after the bolt has been installed in said prestressing relationship. The axial tensioning of the bolt may, therefore, be very precisely determined to any desired degree after the establishment of the prestressing relationship between the bolt and objects. Furthermore, the head of the bolt or the nut, or both, may be formed with metal flexure means thereon axially engaging the prestressed objects and said metal flexure means will aid in retaining the exact desired degree of bolt axial tensioning.

It is still an additional object of my invention to provide a fastener for prestressing objects connected thereby of the foregoing character wherein the bolt shank portion having the object metal displacing flutes formed therein and the shank threaded leading end portion are axially separated by a cold worked area. The cold working of this area relieves directional stresses generated during the thread rolling operation and converts these stresses from a helical clockwise stress direction to a circumferential cold worked stressed area. The cold working of the area converts the known weakest point of the thread runout area into an area whose tensile and fatigue strength are substantially equal to that of the remainder of the fasteners.

When the fastener is installed in bores formed in extremely hard metal objects over 55 Rockwell C scale, the greater resistance of the metal to deformation causes a corresponding deformation of the bolt flutes, thus creating the desired prestressed condition.

It is still a further object of my invention to provide a fastener for prestressing objects connected thereby of the foregoing character wherein, due to the particular manner of the selfestablishment by the bolt of the object tapered opening through metal displacement and cold working so as to produce the desired prestressing relationship between the bolt and the objects, a slight pretensioning of the bolt shank is inherently produced during such installation which results in the connected objects being capable of slight relative movement without disturbing the prestressing relationship between the bolt and objects and this is without regard to any further axial tensioning of the bolt. With an initial slight pretensioning of the bolt merely caused by the original installation thereof during the original formation of the prestressing relationship between the bolt and the objects, relative movement between the objects during later use may take place, serving to relieve this pretensioning and the prestressing relationship will be completely unaffected by such movement. A maximum possible insurance is thereby provided, insuring that the proper desired prestressing relationship between the bolt and objects will be maintained under relatively adverse conditions.

Other objects and advantages of the invention will be apparent from the following specification and the accompanying drawing which is for the purpose of illustration only, and in which:

FIG. 1 is a fragmentary, vertical, sectional view of an embodiment of a fastener according to the principles of the present invention and two objects, said fastener being in the form of a bolt and said objects in the form of abutting metal plates, with said plates having a series of openings formed therethrough showing an opening preparatory to reciving a bolt, and openings in various stages of receiving said bolt for establishing the bolt and object prestressing and bolt tensioning relationships;

FIG. 2 is an enlarged, fragmentary, vertical, sectional view of the form of bolt of FIG. 1;

FIG. 3 is an enlarged, horizontal, sectional view taken along the broken line 3—3 in FIG. 2;

FIG. 4 is a view similar to FIG. 1 showing a slightly modified form of the bolt of FIG. 1 installed extending through the object opening, with the prestressing relationship established between the bolt and objects prior to any axial tensioning of the bolt, and with the prestressing in the objects resulting from said bolt being diagrammatically indicated by broken lines;

FIG. 5 is a fragmentary, horizontal, sectional view taken along the broken line 5—5 in FIG. 4, with said prestressing diagrammatically illustrated in broken lines;

FIG. 6 is a fragmentary, vertical, sectional view similar to FIG. 1 and showing a further modified form of the fastener according to the principles of the present invention, in the form of another type of bolt, installed in prestressing and bolt axial tension relationship connecting two objects, in the form of abutting plates;

FIG. 7 is a view similar to FIG. 6 and showing a still further modified form of the fastener incorporating the principles of the present invention, in the form of a bolt received in a plate blind opening; and FIG. 8 is a view showing a headless fastener.

Referring to FIGS. 1 through 3 of the drawing, a first embodiment of the fastener according to the principles of the present invention in the form of a bolt generally indicated at 10 includes a head 12 integral with a shank 14, said shank having a tapered swaging portion 15 terminating axially spaced from said head in a threaded shank end portion 16. The head 12 is formed with a radially projecting, annular skirt 18 having an under surface 20 which is tapered radially inwardly and axially in an axial direction opposite from the axial extension of the shank 14. The head skirt 18, therefore, projects radially outwardly from the shank 14, with the skirt tapered under surface 20 forming the termination of the head extending radially outwardly from and axially adjacent the shank.

The swaging portion 15 is generally circular in radial cross section, having a one-half degree taper which will function effectively for purposes of the present invention, said shank being of maximum diameter at the head 12 and of minimum diameter at the initiation of the shank threaded end portion 16. The taper can be adjusted to specific applications and it is not intended to limit it to one-half degree. A series of preferably equally circumferentially spaced, generally axially extending swaging flutes 22 are formed in the swaging portion 15 extending virtually the entire length thereof, with said flutes defining intermediate shank engagement portions 24 circumferentially therebetween. The bolt 10 in the embodiment shown in FIGS. 1 through 3 has a definite direction of installation rotation which is clockwise, as indicated by a directional arrow 26 in FIG. 3, and the flutes 22, as well as the intermediate shank engagement portions 24, are formed as spiral flutes and engagement portions, spiraling in the clockwise direction of installation rotation.

In view of the definite direction of installation rotation 26 of the bolt 10, the intermediate shank engagement portions 24 have arcuate, generally axially extending leading edges 28 and trailing edges 30, and the remaining edges defining the flutes 22 are also preferably arcuate, particularly at flute leading ends 32. As best seen in radial cross section in FIG. 3, the intermediate shank engagement portions 24 are radially relieved at the leading edges 28 thereof so as to be of minimum diameter at this point, and the engagement portions increase progressively in diameter to a maximum diameter at the trailing edges 30 thereof. The importance of the foregoing features of construction of the shank 14 will be hereinafter discussed in detail.

The shank threaded end portion 16 is cylindrical, with rolled threads 34 thereof having a maximum diameter slightly less than the minimum diameter of the tapered swaging portion 15. An annular, arcuate cross section, cold rolled groove 36 is formed axially between the shank flute leading ends 32 and the shank threaded end portion 16, said groove serving to convert the helical stress generated by thread rolling into a circumferentially stressed area between the extremities of the flutes 22 and the rolled threads 34 of the shank threaded end portion 16. The shank threaded end portion 16 may be threadably engaged with a nut 38 having an internally relieved and radially outwardly projecting, annular skirt 40, with a radially projecting under surface 42, again, for a purpose to be hereinafter discussed in detail. The threaded end portion may be dispensed with and the smooth extremity beaded in a rivet type application.

The fastener according to the principles of the present invention, in the form of the bolt 10, is fabricated preferably from five percent chrome die tool steel, and in the soft, annealed state, the general configuration of the bolt is achieved by cold or hot forging utilizing bar or wire stock. The forging process results in a bolt blank having a tapered uniform diameter shank which ultimately becomes the swaging portion 15, with the flutes 22 then being rolled into the tapered shank, with the shank then being ground to true up the required one-half degree taper and the previously discussed configuration of the intermediate shank engagement portions 24. All of the previously described forming operations are carried out while the material is in the soft state and the bolt 10 is subsequently heat treated to 260,000 p.s.i. to 280,000 p.s.i. tensile strength and having a resulting Rockwell hardness of 52 to 54 on the C Scale.

The flutes 22 could be formed in the bolt shank 14 after the tapering and heat treatment thereof by a hot rolling process, although the previously described method is preferred.

With the formation of the shank flutes 22 and the later tapering of the swaging portion 15 by grinding, sharp edges inherently result on the flutes so that the leading and trailing edges 28 and 30 of the intermediate shank engagement portions 24 and the flute leading ends 32 are sharp, and such may be eliminated by shot peening, first be steel shot and subsequently by glass beads, both methods being well known to those skilled in the art. The shot peening not only elimates the objectionable sharp edges, but also stress relieves the bolt 10 to eliminate stresses created therein by the taper grinding of the swaging portion 15 so that the shear values, at least of the swaging portion, are materially increased by the cold working attributable to the shot peening. The threads 34 on the shank threaded end portion 16 are rolled after heat traetment of the bolt 10, and such thread rolling, as opposed to conventional thread cutting, imparts an appreciable cold working effect to the shank threaded end portion, improving the fatigue life thereof by a minimum of approximately 25 percent.

The objects to be fastened or connected and prestressed by the bolt 10 are shown in FIG. 1 as abutting metal plates 44 and 46 having outer sides 48 and 50, respectively, and inner abutting sides 52 and 54, respectively, said plates being formed of aluminum, steel, or other metals. Preparatory to receiving the bolt 10, a straight cylindrical opening 56 is drilled continuously through the plates 44 and 46, as shown in FIG. 1, said opening being of uniform diameter throughout the axial extent thereof through the plates and forming a cylindrical plate opening surface 58. As stated, the opening 56 is conventionally drilled or otherwise formed, not requiring reaming or any other finishing for exact sizing thereof, and the uniform diameter thereof for purposes of the present invention is substantially the same as the minimum or leading diameter of the bolt threaded end portion 16, being undersize of the bolt shank maximum diameter at the bolt head 12 by one-thousandth inch to twelve-thousandths inch, dependent on the various factors of bolt shank length, the exact taper on the swaging portion, the accumulated thickness of the plates 44 and 46, and the portions of the accumulated plate thickness it is desired to provide prestressed.

In installation of the bolt 10 into plate prestressing and connecting location, the bolt 10 is positioned with the shank threaded end portion 16 initially received in the plate opening 56, as shown immediately left of center in FIG. 1. In the particular instance illustrated, where prestressing is desired throughout the combined thicknesses of the plates 44 and 46 and where it is desired to ultimately tension the bolt 10 in fastening or connecting position after such prestressing and by use of the nut 38, the axial length of the shank 14 between the head 12 and the cold rolled groove 36 will be substantially equivalent to the combined thickness of the abutting plates, as shown. After initial positioning of the bolt 10 in the plate opening 56, as described, the bolt head 12 is engaged and the bolt is axially driven into the opening by a common nut running tool, well known to those skilled in the art, which nut running tool provides combined axial driving and, in this case, clockwise rotation for the bolt.

In view of the fact that the originally drilled uniform diameter of the opening 56 is equal to the minimum diameter of the bolt threaded end portion 16, the progressive combined axial and rotatable movement of the bolt 10 into the opening immediately causes pressure engagement between the intermediate shank engagement portions 24 and the opening surface 58, which immediately begins a working of the metal of the plate 44 by the swaging portion 15. Important to the principles of the present invention is the fact that this metal working of the plate 44, and eventually the plate 46, is one of metal displacement and metal flow, as opposed to metal cutting and metal removal.

As previously pointed out in the description of the bolt 10, and particularly shown in FIG. 3, the intermediate shank engagement portions 24 are formed with the leading edges 28 thereof relieved progressively to the trailing edges 30 thereof so that the intermediate shank engagement portions gradually engage the opening surface 54, causing the plate metal to be displaced and flow rather than being cut and removed. The metal displacement and flow progressively forms the opening 56 into a tapered opening 60 having the tapered opening surface 62 conforming to the bolt swaging portion 15 when the bolt shank is finally positioned extending completely through the plates 44 and 46, as shown immediately right of center in FIG. 1, and most important, during the metal displacement and flow, the metal forming and immediately surrounding the tapered opening surface 62 is cold worked and cold work hardened simultaneously creating a radial pressure buildup between the bolt swaging portion 15 and the plate metal of both the plates 44 and 46 in a zone surrounding the plate tapered opening 60 and the bolt 10 causing a determined degree of prestressing of the plates. The importance of the lack of metal removal and rather the plate metal displacement and flow while the bolt 10 forms its own tapered opening 60 is the fact that if there would be metal removal rather than metal displacement and flow, there would be no radial pressure buildup between the bolt swaging portion 15 and the plates 44 and 46, and there would be virtually no working of the plate metal.

Referring for the moment to FIGS. 4 and 5, the prestressing of the plates 44 and 46 is illustrated diagrammatically by the broken lines 64 wherein a bolt generally indicated at 66 is installed extending through and forming a plate tapered opening 68, said bolt having a head 70, a tapered shank 72, a cold rolled groove 74 and a shank threaded end portion 76, and being virtually identical to the bolt 10 of FIG. 1, with the exception of straight axially extending flutes 78, rather than the spiral flutes 22 of the FIG. 1 bolt. The zone of prestressing of the plates 44 and 46 diagrammatically illustrated by the broken lines 64 in FIGS. 4 and 5 is well known to those skilled in the art and is substantially the same for all of the fasteners of the present invention, and the axial length of said zone is determined by the axial length of the particular fastener fluted shank. The action of the particular bolt, however, will remain the same.

Returning to FIGS. 1 through 3, after the bolt 10 is finally located extending through the plates 44 and 46, prestressing the plates as described, the bolt will remain so positioned and located without the necessity of any axial force thereon for such retention, completely different from similar fasteners of the prior constructions wherein constant tensile retention forces are required if the prestressing is to be retained. The permanent location of the bolt 10 in prestressing condition is the result of the fact that the bolt swaging portion 15 forms its own tapered opening 60, and particularly by the fact that the tapered opening is formed by metal displacement and flow and not metal cutting. The additional result of the metal working and flow causing cold working and cold work hardening of the plate metal forming the tapered opening surface 62 and surrounding said surface and the bolt swaging portion 15 further assures the retention of the bolt prestressing positioning or location and additionally provides a greater fastening strength resisting working between the plates not heretofore possible with prior constructions.

After the bolt 10 has been installed, as described, the skirt 18 of the bolt head 12 will be initially axially engaged against the outer side 48 of the plate 44, and axial tensioning of the bolt shank 14 may be accomplished to the degree desired by threaded engagement of the nut 38 with the projecting shank threaded end portion 16, as shown at the extreme right in FIG. 1. In order to provide prestressing over the entire axial thickness of the plates 44 and 46, the fluted swaging portion 15 of the bolt 10 extends axially this entire plate thickness from the bolt head 12 at the plate outer side 48, and terminating at the plate outer side 50, with the bolt cold rolled groove 36 projecting axially beyond the plate outer side 50 and the shank threaded end portion 16 spaced outwardly therefrom, as shown. The nut 38 is threaded onto the shank threaded end portion 16 until the nut skirt 40 axially engages the outer side 50 of the plate 46, with further tightening of the nut creating an axial force on the bolt shank 14 causing axial tensioning thereof so as to create combined prestressing of the plates and axial tensioning of the bolt.

During the axial tensioning of the bolt 10 by the nut 38, the particular formation of the head skirt 18 having the angled under surface 20, as hereinbefore described, causes a metal flexure of the head skirt to take place, tending to flatten or reduce the angling of the skirt under surface and creating a resilient axial force assuring retention of the bolt axial tensioning at the desired degree. Obviously, the skirt under surface angling and metal flexure of the head 12 could also be provided at the skirt under surface 42 of the nut 38 for a combined effect, or could be provided solely on the nut 38, rather than the head 12.

The cold rolled groove 36 co-operates with the nut recess defined by the skirt 40 since the nut thread terminated below the nut skirt 40 and, therefore, the first threads of the nut are remote from the point of engagement of the nut with the plate 46, thus avoiding load concentrations on the first two nut threads characteristic of conventional constructions.

Thus, the bolt 10, according to the principles of the present invention, is provided prestressing the plates 44 and 46, as well as connecting or fastening said plates, with the bolt being axially tensioned to any degree desirable for the particular service conditions. A side and additional advantageous result of the particular metal displacement and flow location of the bolt 10 in the prestressing condition is that during such installation of the bolt, considerable torsional stresses are placed thereupon and there is a tendency for the bolt to remain in the torsionally stressed condition which tends to minutely elongate the shank 14 of the bolt after the bolt is finally located. This is in addition to any axial tension placed on the bolt 10 thereafter by the nut 38 and results in the consequent benefit that should the secured plates 44 and 46 be minutely displaced from contact of the inner abutting sides 52 and 54, the release of the torsional load will permit the bolt to accommodate such displacement, resulting in tight securement being maintained.

Certain ilustrative modified forms of the fastener according to the principles of the present invention are shown in FIGS. 6 and 7.

In FIG. 6, a bolt, generally indicated at 80, is located in plate prestressing and axial tensioned condition extending through and projecting from connected or fastened abutting plates 82 and 84, said bolt having a head 86, a tapered shank 88, a cold rolled groove (not shown) and a shank threaded end portion 90 threadably engaged by a nut 92. The bolt head 86, in this case, is formed tapered, incorporates a drive socket 87 and is received countersunk in an outer side 94 of the plate 82, with the tapered shank 88 during the axial and rotatable installation of the bolt 80 forming a matching plate tapered opening 96 by virtue of the shank including circumferentially spaced, generally axially extending, spiral flutes 98 and intermediate shank engagement portions 100. The nut 92 may have an under surface 101 of a skirt 103 originally angled, as previously discussed, for the metal flexure of the skirt during the axial tensioning of the bolt 80.

In view of the tapered bolt head 86 received in the plate 82, the bolt shank 88 is not equal to the accumulated thickness of the plates 82 and 84, and the prestressing of the plates is of less axial length and only over the axial length of the shank 88. Otherwise, the bolt 80 functions in prestressing and axial tensioned relationship with the plates 82 and 84 in the same manner as previously discussed relative to the other forms of the fastener construction of the present invention.

In FIG. 7, a fastener, according to the principles of the present invention, in the form of a bolt 102 is shown received in a blind opening 104 of abutting plates 106 and 108, said bolt having a head 110, a tapered shank 112, with straight axial flutes 114 and intermediate shank engagement portions 116, a stress relief groove 118 and a shank threaded end portion 120. The bolt tapered shank 112 by virtue of the flutes 114 and the intermediate shank engagement portions 116 again forms the plate opening 104 matching tapered adjacent the shank, but said tapered opening terminates axially short of an outer side 122 of the plate 108, the remainder being a threaded opening portion 124 for the threaded engagement by the shank threaded end portion 120. The head 110 is formed with a skirt 126 axially engaged with an outer side 128 of the plate 106, and said skirt may be formed with an angled under surface 130 for providing the head skirt metal flexure, as previously discussed, for resiliently aiding in providing the retention of the axial tensioning of the bolt 102.

In view of the fact that the tapered shank 112 only extends through the plate 106 and partially through the plate 108, with the remainder of the plate thickness containing the threaded opening portion 124, the plates are prestressed only over the axial extent of the shank. Otherwise, the action of the bolt 102 is virtually identical to the other bolts previously described and provides the major portion of the advantages of the present invention.

An embodiment 132 of the fastener of the invention is shown in fragmentary section in FIG. 8 as of uniform tapered cross section and devoid of the conventional head. The shank 134 incorporates a drive socket 136 which may be engaged by an appropriate tool to drive the bolt flush in to the associated opening.

The fastener of the invention can also be provided in the form of a stud wherein the lower extremity is of generally the same configuration as the fastener 10, as shown in FIGS. 1 and 2. However, the nut 38 is dispensed with and the threaded shank portion 16 threadably engaged in a blind bore. The head 12 is eliminated and a conventional stud thread substituted therefor.

Thus, a fastener for prestressing objects connected thereby is provided, according to the principles of the present invention, which does not require costly initial preparation of an opening through the objects for receiving the fastener, which self-establishes its own tapered opening by cold metal working and flow producing inherent advantages of cold work metal strengthening and more positive prestressing retainment, and with which the degree of prestressing and the degree of bolt axial tensioning can be extremely closely controlled, none of which has been possible of attainment with prior fastener constructions of similar character.

I claim:

1. In a prestressed object, the combination of: a metal object having a decreasing size tapered opening of circular cross section formed in said object, the object metal surface forming said opening being circumferentially displaced and pressure worked; and a metal fastener having a shank incorporating a tapered swaging portion positioned in said object tapered opening, said swaging portion having circumferentially spaced swaging flutes formed therein and extending generally axially thereof radially adjacent at least parts of said objects, said swaging portion pressure engaging said object metal surface prestressing a zone of metal of said object around said opening, surface areas on said shank circumferentially between said flutes, said shank having a single direction of installation rotation determining leading edges of said surface areas at one flute and trailing edges of said surface areas at a next circumferentially adjacent flute in said single direction of installation rotation, said surface areas being of minimum radial dimension at said leading edges and increasing progressively in radial dimensions to maximum radial dimensions at said trailing edges.

2. The prestressed object as defined in claim 1 in which said fastener includes said flutes being equally circumferentially spaced.

3. A fastener for reception in an object to be prestressed thereby including: a shank extending axially from one extremity thereof, said shank having a radially inwardly tapered swaging portion with circumferentially spaced swaging flutes formed therein extending generally axially thereof, surface areas on said shank circumferentially between said flutes, said shank having a single direction of installation rotation determining leading edges of said surface areas at one flute and trailing edges of said surface areas at a next circumferentially adjacent flute in said single direction of installation rotation, said surface areas being of minimum radial dimensions at said leading edges and increasing progressively in radial dimensions to maximum radial dimensions at said trailing edges.

4. The fastener as defined in claim 3 in which an annular recess is formed in said shank axially between said flutes and means spaced from said one extremity, said means being adapted for engagement with said object to tension said shank.

5. In a method of fastening and prestressing metal objects, the steps of: forming a metal fastener having a shank incorporating a tapered swaging portion with circumferentially spaced generally axially extending swaging flutes therein; forming a straight cylindrical opening through an object; axially and rotatably inserting said tapered swaging portion in said object opening; during said fastener shank insertion, progressively engaging an object surface surrounding said opening with surfaces of said swaging portion circumferentially between said flutes and displacing object metal without cutting to form said object opening tapered conforming to said taper; during said object metal displacement, pressure engaging said portion with said object to prestress a zone of metal of said object around said opening; after at least the major portion of said object metal displacement and prestressing, axially tensioning said fastener shank; and aiding retainment of said shank tensioning by axially engaged metal flexure between said object and said fastener axially outward of said fastener metal shank.

6. In a method of fastening and prestressing metal objects, the steps of: forming a metal fastener having a shank incorporating a tapered swaging portion with circumferentially spaced generally axially extending swaging flutes therein; forming a straight cylindrical opening through an object; axially and rotatably inserting said tapered swaging portion in said object opening; during said fastener shank insertion, progressively engaging an object surface surrounding said opening with surfaces of said swaging portion circumferentially between said flutes and displacing object metal without cutting to form said object opening tapered conforming to said taper; during said object metal displacement, pressure engaging said portion with said object to prestress a zone of metal of said object around said opening; after at least the major portion of said object metal displacement and prestressing, engaging the opposite ends of said fastener shank respectively with said object; during said engagement of said shank ends with said object, axially tensioning said shank; forming at least one of said engagements between said shank ends and said object through an axially engaged metal flexure between said shank end and said object; and providing an annular stress converting groove in said shank axially between said shank flutes and one of said shank ends.

7. In a method of fastening and prestressing metal objects, the steps of: forming a metal fastener having a shank incorporating a tapered swaging portion with circumferentially spaced generally axially extending swaging flutes therein; forming a straight cylindrical opening through an object; axially and rotatably inserting said tapered swaging portion in said object opening; during said fastener shank insertion, proressively engaging an object surface surrounding said opening with surfaces of said swaging portion circumferentially between said flutes and displacing object metal without cutting to form said object opening tapered conforming to said taper; during said object metal displacement, pressure engaging said portion with said object to prestress a zone of metal of said object around said opening; after at least the major portion of said object metal displacement and prestressing, engaging the opposite ends of said fastener shank respectively with said object; during said engagement of said shank ends with said object, axially tensioning said shank; and providing an annular stress converting groove in said shank axially between said shank flutes and one of said shank ends.

References Cited

UNITED STATES PATENTS

| | | | |
|---|---|---|---|
| 1,926,925 | 9/1933 | Wescott | 85—1 |
| 2,019,049 | 10/1935 | Hoke | 85—1 |
| 2,056,309 | 10/1936 | Osenberg | 85—20 |
| 2,895,368 | 7/1959 | Plàce | 85—9 |
| 3,034,611 | 5/1962 | Zenzic | 287—189.36 |
| 3,056,443 | 10/1962 | Knocke | 151—38 |
| 3,178,984 | 4/1965 | Barothy | 85—9 |
| 3,245,142 | 4/1966 | Williams | 85—1 |
| 3,270,410 | 9/1966 | Salter et al. | 29—446 |
| 3,317,228 | 5/1967 | Storch | 287—189.36 |
| 3,180,126 | 4/1965 | Carlson | 85—47 |

FOREIGN PATENTS

| | | |
|---|---|---|
| 762,333 | 10/1956 | Great Britain. |
| 414,026 | 12/1946 | Italy. |
| 629,722 | 9/1949 | Great Britain. |
| 844,644 | 8/1960 | Great Britain. |
| 1,022,355 | 3/1966 | Great Britain. |

MARION PARSONS, JR., *Primary Examiner.*

U.S. Cl. X.R.

29—525, 526; 85—1, 19, 20